Feb. 21, 1933.                H. KAW ET AL                1,898,730
                                  PISTON
                            Filed Feb. 2, 1929
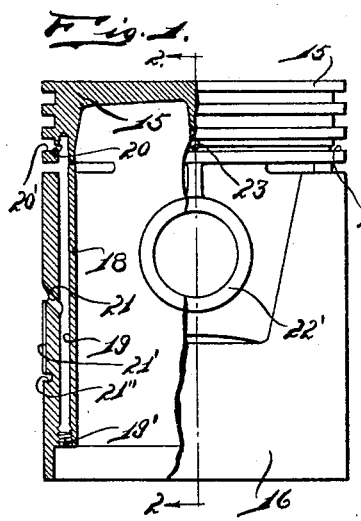
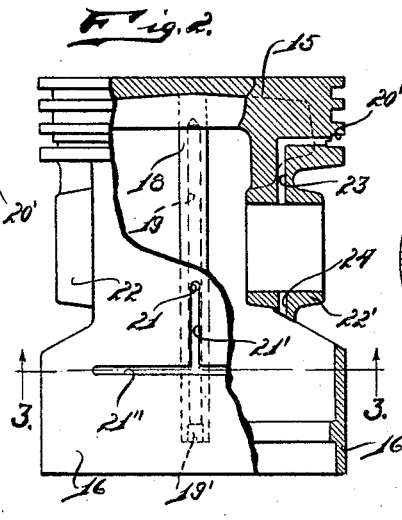
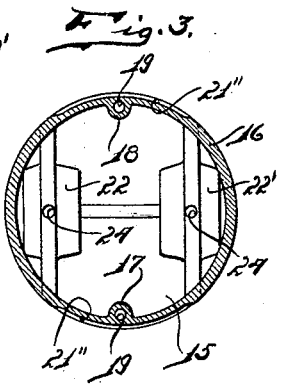
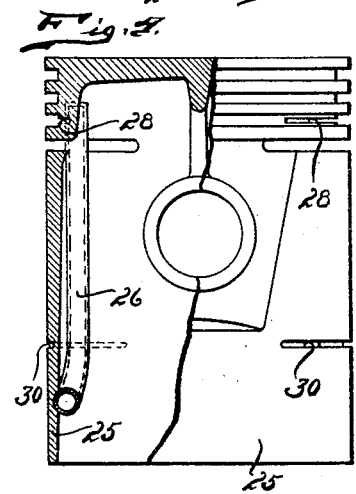
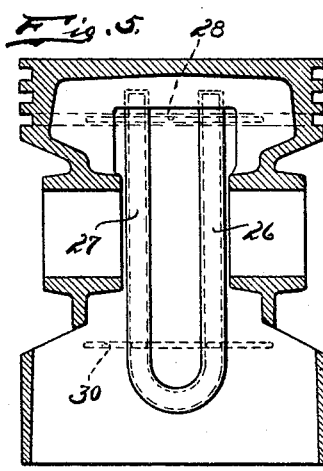
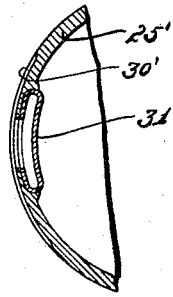
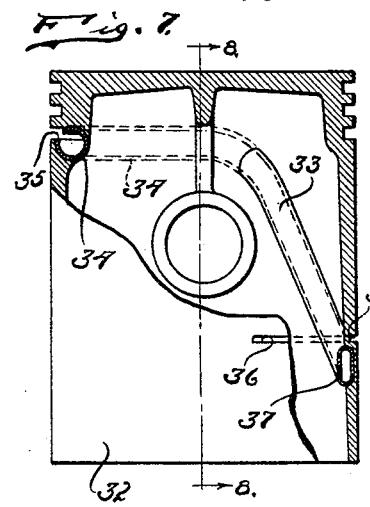
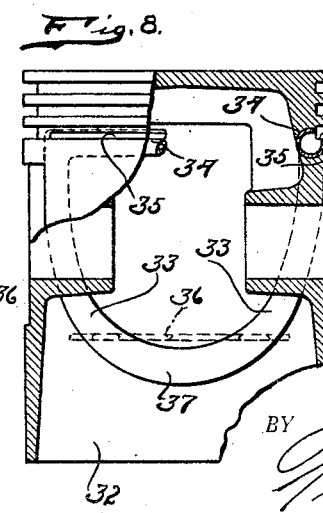
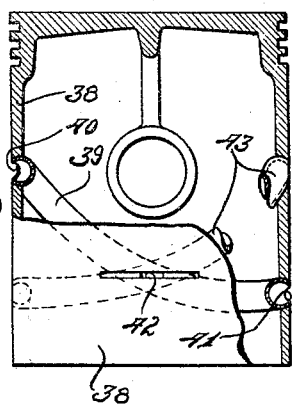
INVENTORS.
Harry Kaw &
John G. Collins.
BY
Thos S Donnelly
ATTORNEY.

Patented Feb. 21, 1933

1,898,730

UNITED STATES PATENT OFFICE

HARRY KAW AND JOHN G. COLLINS, OF DETROIT, MICHIGAN, ASSIGNORS TO NATIONAL ALLOY CO., A CORPORATION OF MICHIGAN

PISTON

Application filed February 2, 1929. Serial No. 336,942.

Our invention relates to a new and useful improvement in a piston and particularly a method of lubricating a piston when in use and providing lubricant for the piston immediately upon a starting of the engine after it has been idle for a period of time sufficient to permit the lubricant upon the walls of the cylinder to have drained therefrom.

It is an object of the present invention to provide a lubricating device on a piston of this class which will be simple in structure, economical of manufacture and highly efficient in use.

Another object of the invention is the provision in a lubricating device having a reservoir positioned therein for retaining oil in position for immediate lubrication upon a starting of the engine.

Another object of the invention is the provision of a lubricating device for a piston which will induce an oil seal at the oil regulating ring for both the up and down strokes.

Other objects will appear hereinafter.

The invention consists in the combination and arrangement of parts hereinafter described and claimed.

The invention will be best understood from a reference to the accompanying drawing which forms a part of this specification, and in which, Fig. 1 is a side elevational view of a piston embodying the invention, with parts broken away and parts shown in section.

Fig. 2 is a fragmentary sectional view taken on line 2—2 of Fig. 1.

Fig. 3 is a sectional view taken on line 3—3 of Fig. 2.

Fig. 4 is a view of a piston with parts shown in section and parts broken away, illustrating a modified form of the invention.

Fig. 5 is a central sectional view through a piston showing the modified form of Fig. 4 in side elevation.

Fig. 6 is a fragmentary sectional view showing a further modified form of the invention.

Fig. 7 is a fragmentary sectional view showing a further modified form of the invention.

Fig. 8 is a view taken on line 8—8 of Fig. 7 with parts broken away and parts shown in section.

Fig. 9 is a central sectional view of a piston illustrating a further modified form of the invention.
In the form shown in Fig. 1, we have illustrated the invention used with a piston having a ring head 15 mounted on a skirt 16, the ring head being provided with the ring grooves in the customary manner. Extending axially of the skirt 16 on the inner surface thereof and cast integral therewith are bosses 17 and 18 which provide channels 19 communicating through the opening 20 with a circumferentially extending groove positioned at the rearward base of the ring groove 20'. Formed in the skirt 16 is a diagonally extending opening 21 which inclines to the axis of the skirt and communicates with the passage 19, this passage 19 being closed at its lower end by a plug 19'. The bearings 22 and 22' have been illustrated as provided with lubricating passages 23 and 24 leading thereto. In the use of this form the oil which communicates in excess at the bottom of the oil ring groove 20' can drain into the passage 19 collecting at the bottom of this passage. When the engine has stood idle for a period of time, the walls of the cylinder will have become free from lubricant and as the engine is started the inertia will force the lubricant formed in the passage 19 below the outlet opening 21 to move to a position where this lubricant will flow through the outlet 21 and serve to lubricate the walls of the cylinder. The lubrication of the piston during the first few strokes when the engine is started is quite important because of the dryness of the cylinder walls and because of the "locking" which has resulted because of the side thrust of the piston against the cylinder wall. Experience has shown that a larger portion of wear on the cylinder and piston is effected during the initial strokes when the engine is operated and to overcome this wear on the cylinder, the piston and connecting parts, is an object of the present invention which is quite efficiently accomplished.

As shown in Fig. 1, leading from the outlet opening 21 is a groove 21' which serves to communicate with the circumferential extending groove 21″, thus affording a means for easily and quickly distributing the lubricant over a large area of the cylinder walls.

In operation, it is desired that these passages 19 be formed at opposite points on the skirt of the piston although it will appear from the description that the number of passages 19 constructed may be determined depending upon the nature of the engine, the speed of operation, etc.

In Figs. 4 and 5, we have shown a U-shaped member having the tubular legs 26 and 27 communicating with the passage 28 which extends into the oil ring groove and serves as a collecting conduit for delivering the lubricant into the U-shaped container. This container in this instance is not cast integral with the skirt 25 but is formed as a separate member and is set in position and anchored in position at the time the cylinder 25 is being cast. A circumferential groove 30 formed on the skirt 25 communicates with the legs 26 and 27 above the bight of the U-shaped member so that the reserve reservoir positioned below the outlet openings and shown in the preferred form is again present in this form with the resulting advantages sought.

In Fig. 6, we have shown a skirt 25′ provided with a flattened and widened single conduit 31 functioning as does the U-shaped container shown in Figs. 4 and 5.

In Figs. 7 and 8 we have shown a further modified form in which legs 33 project upwardly from a bight 37, each of these legs being provided with a circumferentially extending portion 34 communicating through the opening 35 with the oil ring groove on the head. These members 33 communicate with the circumferential groove 36, this groove being positioned, as shown in Fig. 7, above the bight 37 of the U-shaped member so that the reserve reservoir is present in this form. This form of container is also formed separately from the piston and cast therein at the time of casting the piston.

In Fig. 9 we have shown a further modified form in which separate units are secured to the piston at the time of casting the same. In this form, the skirt 38 is provided with a spirally arranged conduit 39 opening at its upper end 40, at its lower end at 41 and intermediate its ends into the groove 42. An oppositely arranged spiral conduit 43 is similarly mounted on the piston skirt.

While we have illustrated and described the preferred form of our invention, we do not wish to limit ourselves to the precise details of structure shown but desire to avail ourselves of such variations and modifications as come within the scope of the appended claims.

Having thus described our invention, what we claim as new, and desire to secure by Letters Patent is:

1. A piston of the class described comprising: a skirt; a lubricant container positioned on the inner surface of said skirt and separate therefrom and communicating through said skirt with the periphery thereof adjacent its upper end and at a point intermediate its ends.

2. A ring bearing piston, comprising: a head; a skirt connected to said head, said head having a plurality of axially spaced circumferential ring receiving grooves and said skirt having a lubricant passage inwardly of its periphery, closed at its lower end and opening into one of the lower of said grooves and communicating intermediate the end of said passage with the periphery of said skirt.

3. A ring bearing piston, comprising: a skirt; a head carried by said skirt and provided with a circumferential peripheral ring receiving oil groove, said skirt having a lubricant passage positioned inwardly of its periphery, closed at its lower end and opening into said groove, and communicating intermediate its ends with the periphery of said skirt.

In testimony whereof we have signed the foregoing specification.

HARRY KAW.
JOHN G. COLLINS.